United States Patent Office 2,955,083
Patented Oct. 4, 1960

2,955,083

CORROSION INHIBITORS IN WELL TREATING COMPOSITIONS

Herman Levin, Houston, Tex., assignor, by mesne assignments, to BJ Service, Inc., Long Beach, Calif., a corporation of Delaware No Drawing. Filed Aug. 13, 1956, Ser. No. 603,795

20 Claims. (Cl. 252—8.55)

This invention relates to the inhibition of corrosion of metals. More particularly it relates to a composition for use in preventing corrosion of metals such as aluminum, iron, admiralty metal, steel and ferrous alloys. The corrosion inhibitor disclosed herein finds specific application in the prevention of corrosion to well equipment due to brine, hydrogen sulphide, and other acid and corrosive constituents of crude oil, as well as protection of the metal parts during the acidizing and fracturing steps in treating wells with hydrochloric acid compositions to aid in bringing such wells into production.

Heretofore it has been the practice to introduce corrosion inhibitors into oil wells to prevent corrosion of the ferrous metal parts. Certain substances have been successful in preventing corrosion due to weak acids and brine. Aliphatic amines, pyridine, pyrimidine have all been used, but none of these has proven satisfactory against corrosion by strong mineral acids, especially at elevated temperatures and pressure.

It is an object of the present invention to prevent corrosion of metals.

It is a further object of this invention to prevent the corrosion of ferrous metals by strong mineral acids, under normal temperatures and pressures as well as at elevated temperatures and pressure.

It is a still further object of this invention to prevent the corrosion of oil well equipment by the usual corrosive agents obtained from such wells, such as brine, hydrogen sulphide and acid constituents of crude oil.

In addition thereto it is an object of this invention to prevent corrosion during the acidizing treatment of oil wells either to initiate production or to increase production during the life of the well.

The present invention comprises the use of substances prepared by condensing in a liquid phase aliphatic and aromatic aldehydes with ammonia or an ammonia derivative in such a manner as to produce a substituted hydrogenated pyridine compound having a substituted group or groups containing 6 to 20 carbon atoms of the general formula $$(C_5H_{(3+a)}N)R_b$$

wherein $a$ is an integer from 0 through 7 and $b$ is an integer from 1 to 3, and the sum of $a+b$ is greater than 2 and less than 9, and R represents at least one substance selected from the group consisting of alkyl and aryl; which substance is attached to the ring.

EXAMPLE 1

1 mol ammonium carbonate
2 mols cinnamaldehyde
4 mols n-butyraldehyde heated at a temperature of 61° to 65° C. (142–150° F.) under atmospheric pressure for 25 minutes. The major portion of the mixed product is 3-benzal-5-ethyl-2-propyl-dihydropyridine (2,3).

In the same manner the following compounds were prepared:

| Compound Designation | Chemical name | Prepared from— | Mol ratio |
|---|---|---|---|
| A | 3-benzal-2-methyl dihydropyridine (2,3). | cinnamaldehyde:acetaldehyde. | 1:2 |
| B | 3 benzal-2-propenyl-(1)-dihydropyridine (2,3). | do | 1:3 |
| C | 3 benzal-2-pentadienyl-(1,3)-dihydropyridine (2,3). | do | 1:4 |
| D | 3 benzal-5-ethyl-2-propyldihydropyridine (2,3). | cinnamaldehyde:n-butyraldehyde. | 1:2 |
| E | 5 amyl-3-ethyl-2-propyldihydropyridine (2,3). | n-butyraldehyde:n-heptaldehyde. | 2:1 |
| F | 3,5 diethyl-2-propyl-dihydropyridine (2,3). | n-butyraldehyde | 3 |

The pyridine ring may be hydrogenated using sodium and alcohol by well known methods.

| Compound Designation | Chemical name | Prepared from— | |
|---|---|---|---|
| Hydrogenated F | 3,5 diethyl-2-propyl tetrahydropyridine. | Compound F | sodium ethanol. |
| Do | 3,5 diethyl-2-propyl-hexahydropyridine. | do | Do. |

It has been found that these compounds reduce the corrosion of steel as much as 99.91% when exposed to extreme surface conditions as immersion in 15% by weight hydrochloric acid solution at a temperature of 300° F. and a pressure of 6,000 p.s.i., the concentration of the inhibitor being 0.15% by weight based on the concentration of the acid.

These compounds have been found to act as corrosion inhibitor where steel is brought into contact with salt solutions in conjunction with sour crude oil containing hydrogen sulphide and certain organic acids as is shown in the following test:

Test 1

Steel coupons were weighed and placed in test tubes containing 20 ml. of 10% NaCl solution and 80 ml. of sour crude (Levelland Pool). To these tubes, varying amounts of compound F were added, the tubes were placed in an agitating water bath, and the coupons were agitated for 36 hours at 100° F. and allowed to stand without agitation at room temperature for 84 hours. Agitation and standing periods were alternated. Coupons were removed, cleaned and reweighed, and weight loss and efficiencies calculated.

RESULTS

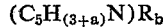

| | Percent weight loss | Percent efficiency |
|---|---|---|
| 1. Blank | 0.52 | |
| 2. 20 gal. F/1,000 gal | 0.004 | 92.31 |
| 3. 10 gal. F/1,000 gal | 0.022 | 57.69 |
| 4. 5 gal. F/1,000 gal | 0.030 | 42.31 |
| 5. 2 gal. F/1,000 gal | 0.032 | 38.46 |
| 6. 1 gal. F/1,000 gal | 0.037 | 28.85 |
| 7. 0.5 gal. F/1,000 gal | 0.048 | 7.69 |
| 8. oil, no brine, no inhibitor | 0.001 | |

These compounds have also been found to inhibit corrosion of steel by a sodium chloride solution.

Test 2

Steel coupons were weighed and placed in test tubes containing 95 ml. of 10% (by wt.) NaCl solution and 5 ml. of methanol (a peptizing agent). To these tubes, varying quantities of compound F were added. The tubes were placed in an agitating water bath, and the coupons were agitated for 36 hours at 100° F. and allowed to stand without agitation for 84 hours at room temperature. Agitation and standing periods were alternated; coupons were removed, cleaned and reweighed, and weight loss and efficiencies calculated.

RESULTS

| | Percent weight loss | Percent efficiency |
|---|---|---|
| 1. Blank | 0.107 | |
| 2. 20 gal. F/1,000 gal | 0.035 | 67.29 |
| 3. 10 gal. F/1,000 gal | 0.056 | 47.66 |
| 4. 5 gal. F/1,000 gal | 0.082 | 23.36 |
| 5. 3 gal. F/1,000 gal | 0.105 | 1.87 |
| 6. 1 gal. F/1,000 gal | 0.094 | 12.15 |
| 7. 0.5 gal. F/1,000 gal | 0.112 | |
| 8. .1 gal. F/1,000 gal | 0.128 | |

Metals other than steel are inhibited against corrosion by various types of corrosive agents. Admiralty metal was tested and the corrosion was reduced.

Test 3

A sample of admiralty metal tubing was obtained and test sections were polished, cleaned, weighed, and placed in test tubes containing 100 ml. of 15% HCl and the required amounts of inhibitor. The tubes were then agitated for two hours at temperatures varying between 206° and 210° F. The tubes were then removed, cleaned and reweighed, and weight loss and efficiencies calculated.

RESULTS

| | Percent weight loss | Percent efficiency |
|---|---|---|
| 1. Blank (no inhibitor) | 0.268 | |
| 2. 10 gal. F/1,000 gal | 0.181 | 32.46 |
| 3. 5 gal. F/1,000 gal | 0.190 | 29.10 |
| 4. 3 gal. F/1,000 gal | 0.159 | 40.67 |
| 5. 1 gal. F/1,000 gal | 0.195 | 27.24 |

Aluminum was tested to determine the effect of the inhibitors when the metal was contacted with a 15% hydrochloric acid solution.

Test 4

Coupons were prepared from Alclad 24S aluminum, and weighed. The coupons were placed in beakers and 150 mls. of 15 percent acid were added. The inhibitor was added and the reaction was allowed to proceed for thirty minutes at 100–110° F. Coupons were then removed, cleaned and reweighed, and weight loss and efficiencies calculated.

RESULTS

| | Percent weight loss | Percent efficiency |
|---|---|---|
| 1. Blank (no inhibitor) | 70.501 | |
| 2. 10 gal. F/1,000 gal | 1.536 | 97.82 |

Test 5

Coupons were prepared from Alclad 24S aluminum, and weighed. These coupons were then placed in beakers containing 150 ml. of 15% hydrochloric acid and varying amounts of compound F, and allowed to stand for 15 minutes in a 100° F. water bath. In this test the coupons were not agitated. At the end of the test period, the coupons were removed, cleaned and reweighed, and weight loss and efficiencies calculated.

RESULTS

| | Percent weight loss | Percent efficiency |
|---|---|---|
| 1. No inhibitor | 74.172 | |
| 2. 20 gal. F/1,000 gal | 0.514 | 99.31 |
| 3. 10 gal. F/1,000 gal | 1.241 | 98.33 |
| 4. 5 gal. F/1,000 gal | 3.553 | 95.21 |
| 5. 2 gal. F/1,000 gal | 20.820 | 71.93 |

The comparative effectiveness of the several dihydropyridine compounds are set forth in the following tests to determine their effectiveness to prevent corrosion of steel by a 15% hydrochloric acid solution.

Test 6

The data in this section consists principally in evaluating the anti-corrosion properties of several substituted dihydropyridine compounds. The tests were performed in 15% hydrochloric acid on coupons of SAE 1026 steel. Tests were conducted at 100–101° F. and 208–210° F. for periods of five hours and one hour, respectively. Methanol or isopropanol was used as a peptizing agent with compounds exhibiting low solubility in 15% HCl.

TESTS CONDUCTED AT 208–210° F. FOR ONE HOUR

| Compound | Percent efficiency at different concentrations | | | |
|---|---|---|---|---|
| | 1 gal./1,000 gal. | 3 gal./1,000 gal. | 5 gal./1,000 gal. | 10 gal./1,000 gal. |
| A | 91.41 | 99.07 | 99.44 | 99.93 |
| B | 91.58 | 99.12 | 99.47 | 99.94 |
| C | 90.47 | 99.30 | 99.48 | 99.93 |
| D | 69.84 | 99.73 | 99.32 | 99.63 |
| F | 32.06 | 74.66 | 90.83 | 97.55 |

TESTS CONDUCTED AT 100° F. FOR FIVE HOURS

| Compound | .005 wt. | .01 wt. | .015 wt. | .03 wt. | .05 wt. | .10 wt. | .15 wt. | .20 wt. |
|---|---|---|---|---|---|---|---|---|
| | Percent | Percent | Percent | Percent | Percent | Percent | Percent | Percent |
| C | 69.50 | 82.55 | 93.98 | 95.17 | 96.44 | 97.56 | 98.25 | |
| D | | | | | 98.00 | 99.36 | 99.53 | 99.65 |
| E | | 93.25 | | 98.58 | 98.96 | 99.23 | 99.27 | |

The tetra-hydro and hexa-hydro compounds referred to above show their effectiveness to prevent the corrosion of steel by a 15% hydrochloric acid solution as set forth in the following tests:

Test 7

| | Percent weight loss | Percent efficiency |
|---|---|---|
| 1. Blank | 35.047 | |
| 2. 10 gal. hydrogenated F (B.P. 482° F–536° F.)/1,000 | .887 | 97.47 |
| 3. 5 gal. hydrogenated F (B.P. 482° F–536° F.)/1,000 | .881 | 97.49 |

Test 8

| | Percent weight loss | Percent efficiency |
|---|---|---|
| 1. Blank | 39.26 | |
| 2. 10 gal. hydrogenated F (B.P. 185–352° F.)/1,000 | 1.093 | 97.22 |
| 3. 10 gal. hydrogenated F (B.P. 345–419° F.)/1,000 | 1.139 | 97.10 |
| 4. 10 gal. hydrogenated F (B.P. 419–563° F.)/1,000 | .658 | 98.32 |
| 5. 10 gal. hydrogenated F (B.P. 568–581° F.)/1,000 | .649 | 98.35 |

Test 9

THE TESTS OF CORROSION INHIBITOR COMPOUNDS A, B, D, E AND F IN 15% SULFURIC ACID

Sulfuric acid was used as a corrosive agent to determine the effectiveness of these inhibitors against sulfuric acid in pickling and in industrial cleaning processes.

Steel coupons were weighed and placed in test tubes containing 100 ml. of 15% by weight sulfuric acid and 10 ml. of isopropyl alcohol or a mixture of isopropyl alcohol and inhibitor totaling 10 ml. in volume. The tubes were placed in an agitating water bath and coupons were agitated for two hours at 160° F. At the end of the test period coupons were cleaned, dried, and weighed with the following results:

|  | Percent weight loss | Percent efficiency |
|---|---|---|
| Compound A: | | |
| Blank | 25.902 | |
| 2 gal. A/1,000 gal. 15% $H_2SO_4$ | 0.682 | 97.37 |
| 5 gal. A/1,000 gal. 15% $H_2SO_4$ | 0.759 | 97.07 |
| 10 gal. A/1,000 gal. 15% $H_2SO_4$ | 0.995 | 96.16 |
| Compound B: | | |
| Blank | 27.169 | |
| 2 gal. B/1,000 gal. 15% $H_2SO_4$ | 0.718 | 97.36 |
| 5 gal. B/1,000 gal. 15% $H_2SO_4$ | 0.433 | 98.41 |
| 10 gal. B/1,000 gal. 15% $H_2SO_4$ | 0.554 | 97.96 |
| Compound D: | | |
| Blank | 27.543 | |
| 2 gal. D/1,000 gal. 15% $H_2SO_4$ | 1.603 | 94.18 |
| 5 gal. D/1,000 gal. 15% $H_2SO_4$ | 1.230 | 95.53 |
| 10 gal. D/1,000 gal. 15% $H_2SO_4$ | 1.178 | 95.72 |
| Compound E: | | |
| Blank | 29.225 | |
| 2 gal. E/1,000 gal. 15% $H_2SO_4$ | 1.071 | 96.34 |
| 5 gal. E/1,000 gal. 15% $H_2SO_4$ | 1.347 | 95.39 |
| 10 gal. E/1,000 gal. 15% $H_2SO_4$ | 1.473 | 94.96 |
| Compound F: | | |
| Blank | 29.225 | |
| 2 gal. F/1,000 gal. 15% $H_2SO_4$ | 1.887 | 93.54 |
| 5 gal. F/1,000 gal. 15% $H_2SO_4$ | 1.350 | 95.38 |
| 10 gal. F/1,000 gal. 15% $H_2SO_4$ | 1.334 | 95.44 |

Test 10

TEST OF INHIBITOR COMPOUNDS A, B, D, E AND F IN 15% HYDROCHLORIC ACID

This test was run similar to Test 9 only using hydrochloric instead of sulfuric acid to demonstrate the use of these corrosion inhibitors in pickling of various metals or in industrial cleaning operations on heat exchangers, etc.

Steel coupons were weighed and placed in test tubes containing 100 ml. of 15% by weight hydrochloric acid and 10 ml. of isopropyl alcohol or a mixture of isopropyl alcohol and inhibitor totaling 10 ml. in volume. The tubes were placed in an agitating water bath and the reaction was allowed to proceed for a period of 1 hour at a temperature of 208–210° F.

|  | Percent weight loss | Percent efficiency |
|---|---|---|
| Compound A: | | |
| Blank | 32.082 | |
| 2 gal. A/1,000 gal. 15% HCl | .188 | 99.41 |
| 5 gal. A/1,000 gal. 15% HCl | .280 | 99.13 |
| 10 gal. A/1,000 gal. 15% HCl | .374 | 98.83 |
| Compound B: | | |
| Blank | 30.840 | |
| 2 gal. B/1,000 gal. 15% HCl | .174 | 99.44 |
| 5 gal. B/1,000 gal. 15% HCl | .166 | 99.46 |
| 10 gal. B/1,000 gal. 15% HCl | 2.41 | 99.22 |
| Compound D: | | |
| Blank | 36.248 | |
| 2 gal. D/1,000 gal. 15% HCl | .251 | 99.31 |
| 5 gal. D/1,000 gal. 15% HCl | .383 | 98.94 |
| 10 gal. D/1,000 gal. 15% HCl | .437 | 98.79 |
| Compound E: | | |
| Blank | 32.242 | |
| 2 gal. E/1,000 gal. 15% HCl | 18.239 | 43.43 |
| 5 gal. E/1,000 gal. 15% HCl | 1.150 | 96.43 |
| 10 gal. E/1,000 gal. 15% HCl | .932 | 97.11 |
| Compound F: | | |
| Blank | 34.466 | |
| 2 gal. F/1,000 gal. 15% HCl | 13.130 | 61.90 |
| 5 gal. F/1,000 gal. 15% HCl | 4.538 | 86.83 |
| 10 gal. F/1,000 gal. 15% HCl | .724 | 97.90 |

Test 11

CAUSTIC CORROSION OF ALUMINUM

Coupons of Alclad 24S aluminum were weighed and placed in test tubes containing 100 ml. of 15% sodium hydroxide solution to which had been added alcoholic solutions of the inhibitors. Test temperature was approximately 210° F. and test time 10 minutes. The following results were obtained:

|  | Percent weight loss | Percent efficiency |
|---|---|---|
| Blank | 18.351 | 0 |
| 5 gal. per thousand Compound A | 12.303 | 32.96 |
| 5 gal. per thousand Compound B | 12.754 | 30.50 |
| 5 gal. per thousand Compound D | 12.098 | 34.07 |
| 5 gal. per thousand Compound E | 13.087 | 28.69 |
| 5 gal. per thousand Compound F | 9.444 | 48.54 |

Test 12

TESTS OF INHIBITOR COMPOUNDS A, B, D, E AND F IN 15% HYDROCHLORIC ACID WITH ALUMINUM

Coupons of 24S Alclad aluminum, size 1 in. x 2⅝ in. x 5/32 in. were cleaned, weighed, and placed in 150 ml. portions of hydrochloric acid (15%) containing enough 20% by volume alcoholic solutions of the inhibitors to be equivalent to 5 gallons of pure inhibitor per 1000 gallons of acid. The initial temperature was 100° F. and the test time was 10 minutes. The inhibitors were found to be quite satisfactory in this environment.

|  | Percent weight loss | Percent efficiency |
|---|---|---|
| Blank | 30.218 | |
| 5 gal. A/1,000 gal. 15% HCl | .050 | 99.83 |
| 5 gal. B/1,000 gal. 15% HCl | .098 | 99.68 |
| 5 gal. D/1,000 gal. 15% HCl | .104 | 99.66 |
| 5 gal. E/1,000 gal. 15% HCl | 6.798 | 77.50 |
| 5 gal. F/1,000 gal. 15% HCl | 5.381 | 82.19 |

The solubility of this new group of corrosion inhibitors in water, salt and acid solutions is very low. It has been found possible to fully peptize these new inhibitors in polar solutions by the use of appropriate co-solvents, such as methanol, acetone, ethyl alcohol, isopropyl alcohol, methyl ethyl ketone and others of similar structure. The inhibitor is first dissolved in the co-solvent so as to give about a 20% solution. This solution is added to the liquid to be inhibited in such quantity as to yield the required concentration of inhibitor necessary for satisfactory operation.

This new group of corrosion inhibitors may be used to prevent corrosion of metals by the usual corrosion agents and in addition thereto may also prevent the corrosion of metals by strong inorganic acids or alkalis. They find wide use in the oil industry, particularly in the acidizing of oil wells by means of hydrochloric acid compositions which is a common step in the treatment of oil wells to bring them into production and also may be applied to old wells that have ceased to produce because corrosion of the casing and the attached Christmas tree as well as the pump equipment by the acid used is a serious factor in the treatment of these wells. This invention enables the corrosion to be reduced by 99%.

These corrosion inhibitors also find extensive use in pickling and in industrial cleaning wherein strong acids and alkalis are used. In particular, the reduction of corrosion of aluminum by strong alkalis allows the use of this metal in contact with these materials for the first time.

This application is a continuation-in-part of my co-pending application Serial No. 425,326, filed April 23, 1954, now abandoned.

Many advantages in the use of this class of compound will be apparent to one skilled in the art. The above examples are given for illustrative purposes only and do not limit this invention, which is only limited by the scope of the claims hereto attached.

What is claimed is:

1. A well treating composition comprising an aqueous hydrochloric acid solution and a corrosion inhibitor comprising a derivative of a hydrogenated pyridine of the formula type

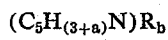

wherein $a$ is an integer from 0 through 5 and $b$ is an integer from 1 to 3 and the sum of $a+b$ is greater than 2 and less than 7 and R represents at least one substance selected from the group consisting of alkyl and aryl; which substance is attached to the ring.

2. The well treating composition of claim 1, wherein the total substance selected from the group consisting of alkyl and aryl contains from 6 to 20 carbon atoms.

3. The well treating composition of claim 1, wherein the total substance from the group consisting of alkyl and aryl contains 10 carbon atoms.

4. A process for the prevention of corrosion by aqueous acid well constituents of metals selected from the group consisting of ferrous metals, aluminum, and admiralty metal in an oil well comprising the steps of introducing into such well in an aqueous medium a substituted hydrogenated pyridine of the formula type

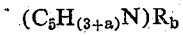

wherein $a$ is an integer from 0 through five and $b$ is an integer from 1 to 3 and the sum of $a+b$ is greater than 2 and less than 7 and R represents at least one substance selected from the group consisting of alkyl and aryl; which substance is attached to the ring.

5. The process of claim 4, wherein the corrosion inhibitor is introduced into the aqueous medium in conjunction with an oxygenated organic solvent as a peptizing agent.

6. A process for the prevention of corrosion by aqueous acid well constituents of metals selected from the group consisting of ferrous metals, aluminum, and admiralty metal in an oil well comprising the steps of introducing into such well in an aqueous medium a dihydropyridine having at least one side chain thereon, said side chain selected from the group consisting of alkyl and aryl containing from 6 to 20 carbon atoms.

7. A process for the prevention of corrosion by aqueous acid well constituents of metals selected from the group consisting of ferrous metals, aluminum, and admiralty metal in an oil well comprising the steps of introducing into such well in an aqueous medium a tetrahydropyridine having at least one side chain thereon, said side chain selected from the group consisting of alkyl and aryl containing from 6 to 20 carbon atoms.

8. A process for the prevention of corrosion by aqueous acid well constituents of metals selected from the group consisting of ferrous metals, aluminum, and admiralty metal in an oil well comprising the steps of introducing into such well in an aqueous medium a 2-propyl hexahydropyridine.

9. A process for the prevention of corrosion of metals selected from the group consisting of ferrous metals, aluminum and admiralty metal in an oil well when exposed to a hydrochloric acid solution, comprising the steps of incorporating in a corrosive oil well treating fluid a small quantity of 3,5-diethyl-2-propyl-dihydropyridine-(2,3).

10. A process for the prevention of corrosion by aqueous acid well constituents of metals selected from the group consisting of ferrous metals, aluminum, and admiralty metal in an oil well comprising the steps of introducing into such well in an aqueous medium 3,5-diethyl-2-propyl-dihydropyridine-(2,3).

11. A process for the prevention of corrosion by aqueous acid well constituents of metals selected from the group consisting of ferrous metals, aluminum, and admiralty metal in an oil well comprising the steps of introducing into such well in an aqueous medium 3-benzal-2-methyl-dihydropyridine-(2,3).

12. A process for the prevention of corrosion by aqueous acid well constituents of metals selected from the group consisting of ferrous metals, aluminum, and admiralty metal in an oil well comprising the steps of introducing into such well in an aqueous medium 3-benzal-2-propenyl-(1)-dihydropyridine-(2,3).

13. A process for the prevention of corrosion by aqueous acid well constituents of metals selected from the group consisting of ferrous metals, aluminum, and admiralty metal in an oil well comprising the steps of introducing into such well in an aqueous medium 3-benzal-2-pentadienyl-(1,3)-dihydropyridine-(2,3).

14. A process for the prevention of corrosion by aqueous acid well constituents of metals selected from the group consisting of ferrous metals, aluminum and admiralty metal in an oil well comprising the steps of introducing into such well in an aqueous medium 3-benzal-5-ethyl-2-propyl-dihydropyridine-(2,3).

15. A process for the prevention of corrosion by aqueous acid well constituents of metals selected from the group consisting of ferrous metals, aluminum and admiralty metal in an oil well comprising the steps of introducing into such well in an aqueous medium 5-amyl-3-ethyl-2-propyl-dihydropyridine-(2,3).

16. A process for the prevention of corrosion of ferrous metals by a hydrochloric acid solution comprising the steps of introducing into said solution a dihydropyridine having at least one side chain thereon selected from the group consisting of alkyl and aryl and containing from 6 to 20 carbon atoms, then contacting said metal with said solution.

17. A process for the prevention of corrosion of admiralty metal by a hydrochloric acid solution comprising the steps of introducing into said solution a dihydropyridine having at least one side chain thereon selected from the group consisting of alkyl and aryl and containing from 6 to 20 carbon atoms, then contacting said metal with said solution.

18. A process for the prevention of corrosion of aluminum by a hydrochloric acid solution comprising the steps of introducing into said solution dihydropyridine having at least one side chain thereon selected from the group consisting of alkyl and aryl and containing from 6 to 20 carbon atoms, then contacting said metal with said solution.

19. A process for the prevention of corrosion of ferrous metals by a sulfuric acid solution comprising the steps of introducing into said solution a dihydropyridine having at least one side chain thereon selected from the group consisting of alkyl and aryl and containing from 6 to 20 carbon atoms, then contacting said metal with said solution.

20. A process for the prevention of corrosion of aluminum by a sodium hydroxide solution comprising the steps of introducing into said solution a dihydropyridine having at least one side chain thereon selected from the group consisting of alkyl and aryl and containing from 6 to 20 carbon atoms, then contacting said metal with said solution.

References Cited in the file of this patent

UNITED STATES PATENTS

| | | |
|---|---|---|
| 2,388,059 | Herlocker | Oct. 30, 1945 |
| 2,472,400 | Bond et al. | June 7, 1949 |
| 2,493,462 | Menaul | Jan. 3, 1950 |
| 2,694,001 | Hayes et al. | Nov. 9, 1954 |
| 2,698,295 | Cardwell et al. | Dec. 28, 1954 |
| 2,748,140 | Schmidle et al. | May 29, 1956 |
| 2,750,385 | Schmidle et al. | June 12, 1956 |
| 2,776,263 | Hiskey et al. | Jan. 1, 1957 |
| 2,784,192 | Schmidle et al. | Mar. 5, 1957 |
| 2,807,585 | Gardner et al. | Sept. 24, 1957 |

UNITED STATES PATENT OFFICE
CERTIFICATE OF CORRECTION

Patent No. 2,955,083

October 4, 1960

Herman Levin

It is hereby certified that error appears in the above numbered patent requiring correction and that the said Letters Patent should read as corrected below.

Column 5, second table, under the heading "Percent weight loss", line 8 thereof, for "2.41" read -- .241 --.

Signed and sealed this 1st day of October 1963.

(SEAL)
Attest:

ERNEST W. SWIDER

Attesting Officer

DAVID L. LADD

Commissioner of Patents